United States Patent
Brown et al.

(10) Patent No.: US 7,685,113 B2
(45) Date of Patent: Mar. 23, 2010

(54) DEMAND BREAKOUT FOR A SUPPLY CHAIN

(75) Inventors: Richard W. Brown, Cambridge, MA (US); Paul T. Chapman, Hollis, NH (US)

(73) Assignee: i2 Technologies US, Inc., Dallas, TX (US)

( * ) Notice: Subject to any disclaimer, the term of this patent is extended or adjusted under 35 U.S.C. 154(b) by 0 days.

(21) Appl. No.: 11/875,403

(22) Filed: Oct. 19, 2007

(65) Prior Publication Data

US 2008/0040186 A1 Feb. 14, 2008

Related U.S. Application Data

(60) Continuation of application No. 10/823,056, filed on Apr. 13, 2004, now Pat. No. 7,590,555, which is a division of application No. 09/895,487, filed on Jun. 29, 2001, now Pat. No. 7,248,937.

(51) Int. Cl.
*G06F 7/00* (2006.01)
*G06F 17/00* (2006.01)

(52) U.S. Cl. .................. 707/3; 707/104.1; 705/29; 235/375

(58) Field of Classification Search .................. 705/29; 235/375, 385; 707/3, 10, 100, 104.1
See application file for complete search history.

(56) References Cited

U.S. PATENT DOCUMENTS

| | | | |
|---|---|---|---|
| 5,712,989 A | 1/1998 | Johnson et al. | |
| 5,914,878 A | 6/1999 | Yamamoto et al. | |
| 5,930,156 A | 7/1999 | Kennedy | |
| 5,953,707 A | 9/1999 | Huang et al. | |
| 6,151,582 A | 11/2000 | Huang et al. | |
| 6,157,915 A | 12/2000 | Bhaskaran et al. | |
| 6,167,380 A | 12/2000 | Kennedy et al. | |
| 6,332,155 B1 | 12/2001 | Notani | |
| 6,370,509 B1 | 4/2002 | Ross et al. | |
| 6,477,660 B1 | 11/2002 | Sohner | |
| 6,486,899 B1 | 11/2002 | Bush, Jr. | |
| 6,546,303 B1 | 4/2003 | Fried et al. | |
| 6,577,304 B1 | 6/2003 | Yablonski et al. | |
| 6,591,153 B2 | 7/2003 | Crampton et al. | |
| 6,601,233 B1 | 7/2003 | Underwood | |
| 6,609,101 B1 | 8/2003 | Landvater | |
| 6,629,081 B1 | 9/2003 | Cornelius et al. | |
| 6,671,673 B1 | 12/2003 | Baseman et al. | |
| 6,671,818 B1 | 12/2003 | Mikurak | |

(Continued)

*Primary Examiner*—Andrew Joseph Rudy
(74) *Attorney, Agent, or Firm*—Booth Udall, PLC; Steven J. Laureanti

(57) ABSTRACT

A system for demand breakout for a supply chain includes a memory operable to store a plurality of orders for at least one product. Each product may be produced using at least one precursor. The memory is also operable to store a production schedule identifying one or more resources in the supply chain, a quantity of each product and precursor scheduled to be produced by the resources, and a time period associated with production of each product and precursor. The system also includes one or more processors collectively operable to identify one or more particular units of the product that correspond to each product order. The one or more processors are also collectively operable to identify one or more particular units of one or more precursors that correspond to each product order.

17 Claims, 8 Drawing Sheets

U.S. PATENT DOCUMENTS

| | | |
|---|---|---|
| 6,701,201 B2 | 3/2004 | Hegde et al. |
| 6,778,872 B2 | 8/2004 | Jorgenson et al. |
| 6,834,266 B2 | 12/2004 | Kumar et al. |
| 6,889,187 B2 | 5/2005 | Zhang |
| 6,889,197 B2 | 5/2005 | Lidow |
| 6,898,472 B2 | 5/2005 | Crampton et al. |
| 6,947,905 B1 | 9/2005 | Starr et al. |
| 6,952,807 B1 | 10/2005 | Antosz |
| 6,954,736 B2 | 10/2005 | Menninger et al. |
| 7,003,474 B2 * | 2/2006 | Lidow .......................... 705/7 |
| 7,117,130 B1 * | 10/2006 | Megiddo ....................... 703/2 |
| 7,177,827 B1 * | 2/2007 | Abraham ..................... 705/28 |
| 7,248,937 B1 * | 7/2007 | Brown et al. .................. 700/99 |
| 7,249,044 B2 * | 7/2007 | Kumar et al. .................. 705/8 |
| 7,313,534 B2 * | 12/2007 | Scheer .......................... 705/9 |
| 7,430,610 B2 * | 9/2008 | Pace et al. ................... 709/233 |
| 7,441,710 B2 * | 10/2008 | Perkowski .................. 235/492 |

* cited by examiner

| | ITEM | QUANTITY | BUCKET | PRECURSOR(S) | PRODUCTION RESOURCE | TARGET RESOURCE |
|---|---|---|---|---|---|---|
| 202a → | B | 500 | 8 | D, E | 108c | 108a |
| 202b → | B | 450 | 9 | D, E | 108c | 108a |
| 202c → | C | 250 | 7 | E, F | 108c | 108a |
| 202d → | C | 250 | 10 | E, F | 108c | 108a |
| 202e → | D | 800 | 7 | G | 108e | 108c |
| 202f → | D | 700 | 8 | G | 108e | 108c |
| 202g → | E | 500 | 6 | H, I | 108e | 108c |
| 202h → | E | 500 | 7 | H, I | 108f | 108c |
| 202i → | E | 450 | 8 | H, I | 108f | 108c |
| 202j → | E | 500 | 9 | H, I | 108e | 108c |
| 202k → | F | 1,000 | 6 | H, I, J | 108f | 108c |
| 202l → | F | 950 | 9 | H, I, J | 108f | 108c |

FIG. 3

| PRECURSOR | QUANTITY PER UNIT OF PRODUCT |
|---|---|
| H | 2.0 |
| I | 0.5 |
| J | 1.0 |

FIG. 4

| ATTRIBUTE | WEIGHT |
|---|---|
| IMPORTANCE OF ENTITY PLACING ORDER | 70% |
| PRIORITY OF ORDER | 30% |

FIG. 7

START
702 — RECEIVE ORDERS FOR A PRODUCT
704 — RECEIVE PRODUCTION SCHEDULE FOR THE SUPPLY CHAIN
706 — ALLOCATE AT LEAST A PORTION OF THE PRODUCT TO ONE OR MORE ORDERS
708 — ALLOCATE AT LEAST A PORTION OF ONE OR MORE PRECURSORS TO AN ORDER
END

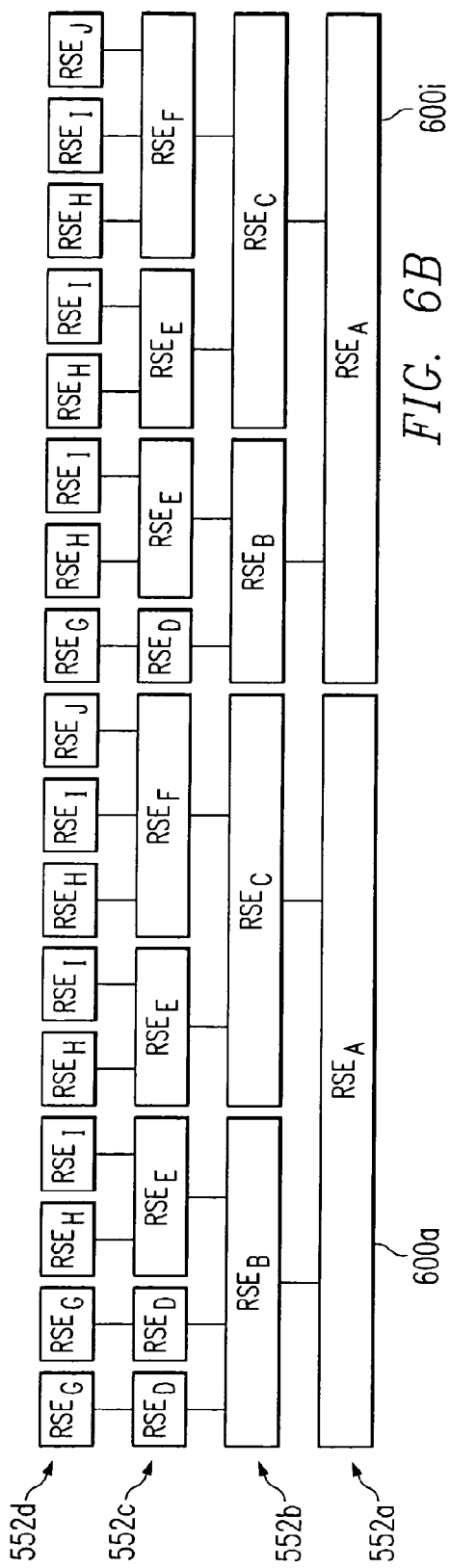
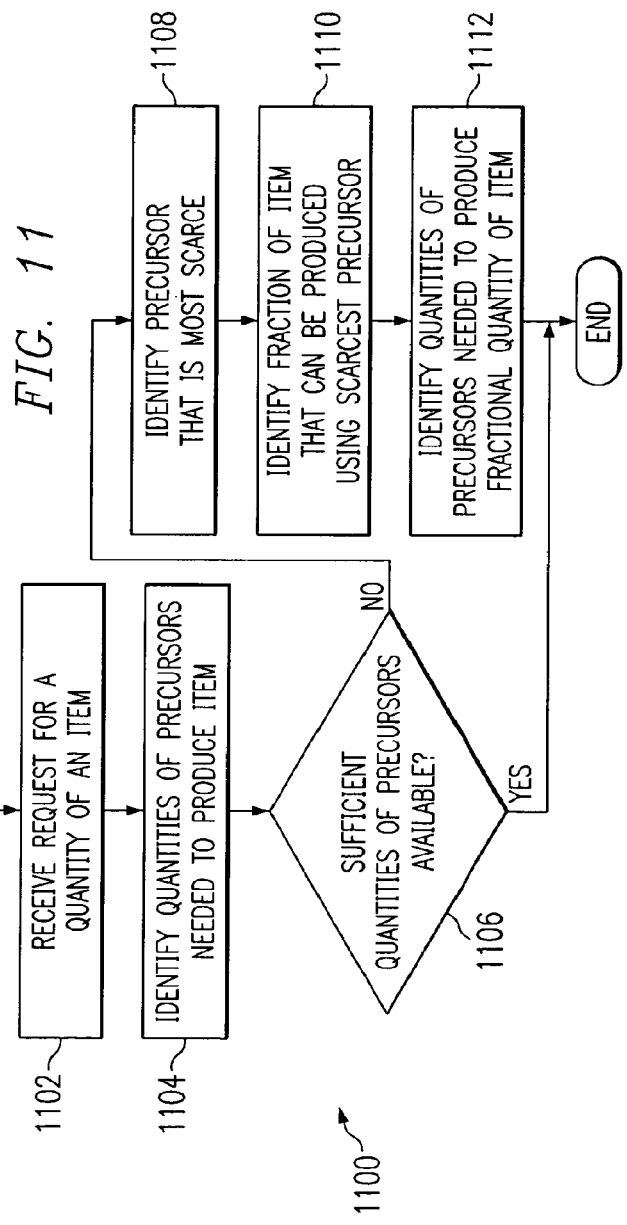
FIG. 6B
FIG. 11

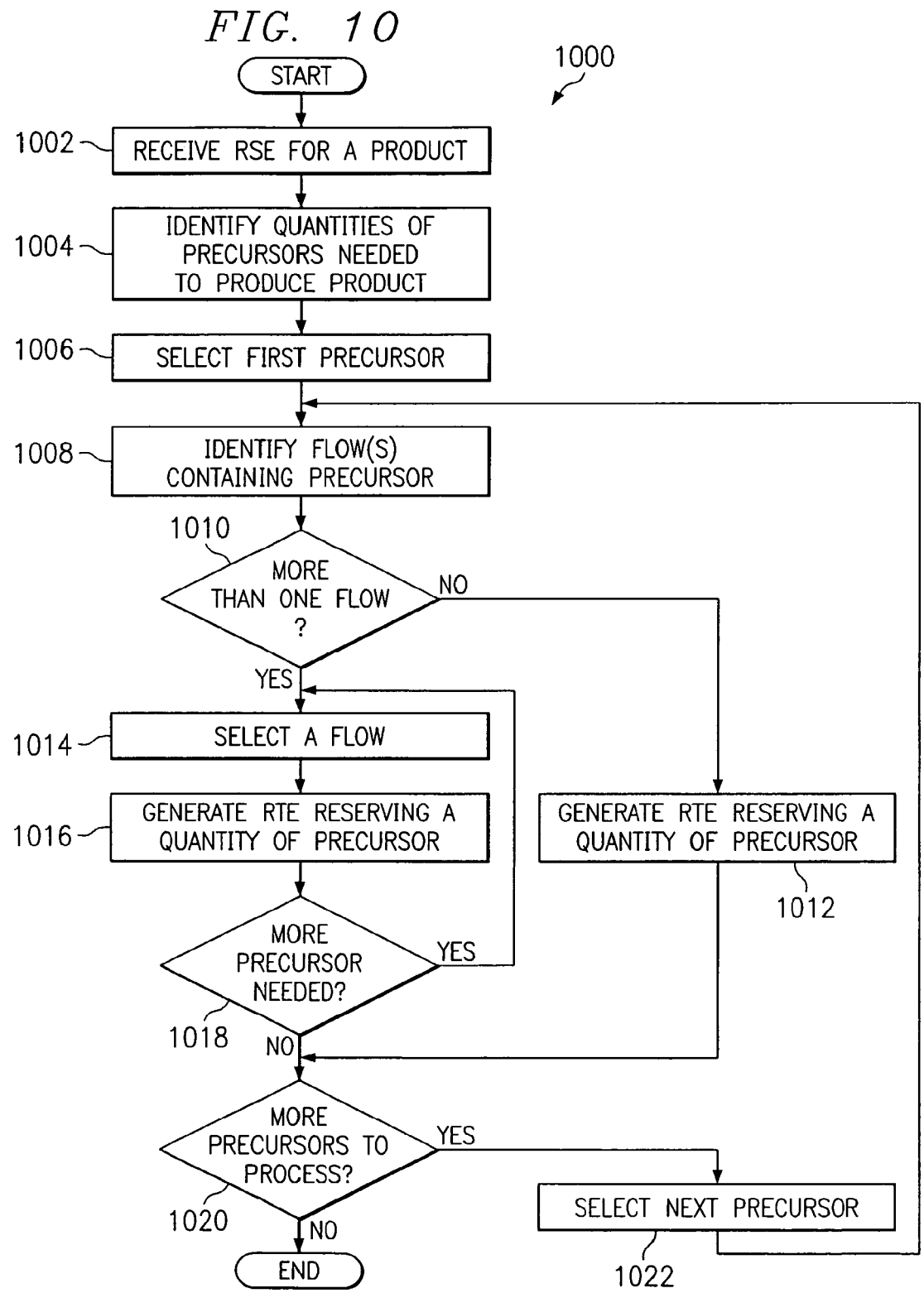

DEMAND BREAKOUT FOR A SUPPLY CHAIN

CLAIM OF PRIORITY

This application is a continuation of U.S. patent application Ser. No. 10/823,056, filed on 13 Apr. 2004 and entitled "DEMAND BREAKOUT FOR A SUPPLY CHAIN" now U.S. Pat. No. 7,590,555 which is a divisional of U.S. patent application Ser. No. 09/895,487, filed on 29 Jun. 2001 and entitled "DEMAND BREAKOUT FOR A SUPPLY CHAIN", now U.S. Pat. No. 7,248,937. U.S. Pat. No. 7,590,555 and U.S. Pat. No. 7,248,937 are commonly assigned to the assignee of the present application. The disclosure of related U.S. Pat. No. 7,590,555 and U.S. Pat. No. 7,248,937 are hereby incorporated by reference into the present disclosure as if fully set forth herein.

BACKGROUND

1. Technical Field of the Invention

This invention relates generally to the field of planning, and more particularly to demand breakout for a supply chain.

2. Background of the Invention

A manufacturer typically receives orders for different products from multiple customers. These orders may identify a quantity of each product ordered and a date by which each product should be delivered. Using these orders, the manufacturer typically engages in a task called "master production scheduling," during which the manufacturer determines which products to produce during a particular production period, how much of each product to produce during that production period, and when during that production period each product will be produced. For example, the schedule might specify that the manufacturer will produce one thousand units of a first product during each of the first and third days of a production period and two thousand units of a second product during each of the second, fourth, and fifth days of the production period. A problem with conventional techniques is that the schedule typically fails to identify which product orders correspond to the products being produced during the production period. Using the above example, six customers may have ordered the second product, but the schedule fails to identify which customer or customers will receive the product produced on the second day of the production period. As a result, customers may be unable to learn when the manufacturer will produce products for their particular order or orders, and the manufacturer may be unaware of which customer's order it is filling at any given time.

SUMMARY OF THE INVENTION

According to the present invention, problems and disadvantages associated with supply chain scheduling have been substantially reduced or eliminated.

In one aspect of the invention, a method for demand breakout for a supply chain includes accessing a plurality of orders for at least one product, where each product is produced using at least one precursor. The method also includes accessing a production schedule identifying one or more resources in the supply chain, a quantity of each product and precursor scheduled to be produced by the resources, and a time period associated with production of each product and precursor. The method further includes identifying one or more particular units of the product that correspond to each product order. In addition, the method includes identifying one or more particular units of one or more precursors that correspond to each product order.

One or more technical advantages may be provided according to various embodiments of the present invention. Particular embodiments of the invention may exhibit none, some, or all of the following advantages. For example, in one embodiment, a system for demand breakout for a supply chain is provided. The system may use a production schedule for a production period and determine which product orders correspond to the items the manufacturer or other producer is producing during the production period. For example, the system may determine that the first one hundred units of an item will be used to fill a first product order and the next six hundred units of the item will be used to fill a second product order. As a result, the producer may be able to identify which product order is being filled by the items being produced at any given time, and a customer may know when the customer's order is being filled. This may allow, for example, the producer to more accurately estimate when the customer's order will be completed. This may also allow the customer to gain improved visibility into the supply chain, since the customer may know which items being produced correspond to the customer's order.

The system may also take into account a user's preferences in identifying which product orders correspond to the items being produced. For example, in a particular embodiment, the user may specify the importance of a customer or the priority of an order. The system may use the preferences while identifying which product orders correspond to the items being produced. As an example, the system may determine that orders from a more important customer correspond to items produced earlier in a production period, allowing that customer to receive its order more quickly. This allows the system to take into account the user's preferences in assigning produced items to product orders. This also allows the system to assign the produced items to product orders in different ways for different users, depending on the priorities of those users.

Other technical advantages may be readily apparent to those skilled in the art from the figures, descriptions, and claims included herein.

BRIEF DESCRIPTION OF THE DRAWINGS

To provide a more complete understanding of the present invention and certain features and advantages thereof, reference is made to the following description taken in conjunction with the accompanying drawings, in which:

FIG. 3 illustrates an example bill of materials (BOM) table;

FIG. 4 illustrates an example preference table;

FIGS. 6A and 6B illustrate example events used to allocate items to product orders in a supply chain;

FIG. 7 illustrates an example method for demand breakout for a supply chain;

FIG. 10 illustrates an example method for executing an event to allocate items to a product order; and FIG. 11 illustrates an example method for identifying quantities of items to be allocated to a product order.

DETAILED DESCRIPTION OF THE DRAWINGS

Figures 1, 2:
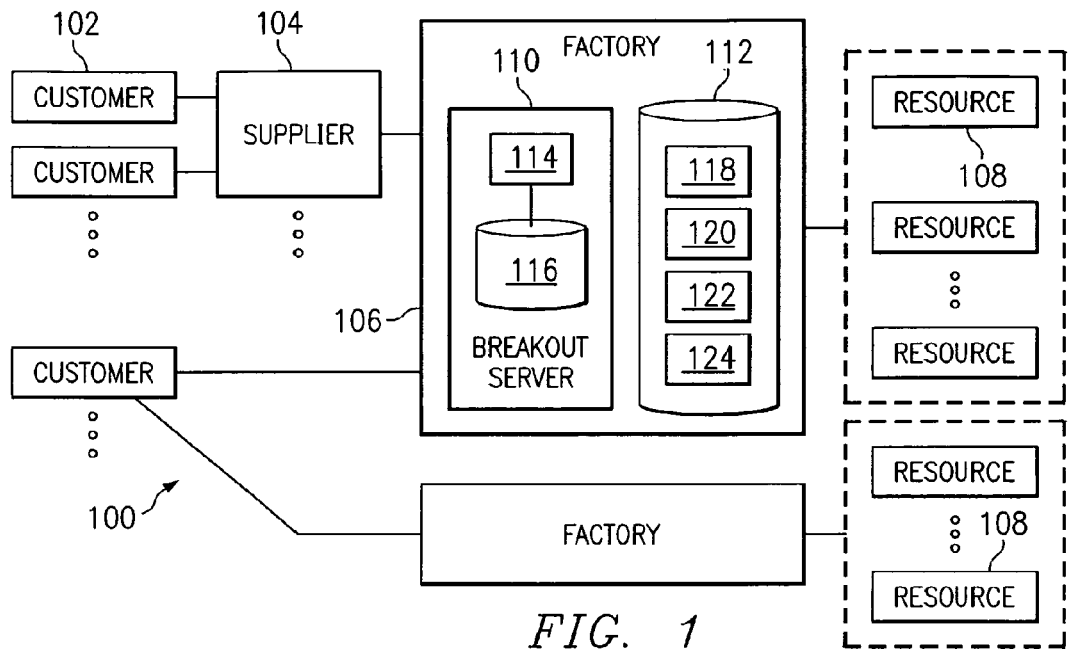
FIG. 1 illustrates an example system for demand breakout for a supply chain.
FIG. 2 illustrates an example production table.

FIG. 1 illustrates an example system 100 for demand breakout for a supply chain. In the illustrated embodiment, system 100 includes one or more customers 102, one or more suppliers 104, one or more factories 106, and one or more resources 108. Other embodiments of system 100 may be used without departing from the scope of the present invention.

Customer 102 may be any suitable entity that obtains at least one product from one or more suppliers 104 and/or one or more factories 106. In this document, the term "product" refers to any manufactured, fabricated, assembled, or otherwise processed item and includes intermediate products and finished end products. Also, the term "item" refers to a raw material, part, component, assembly, intermediate product, or any other suitable material used to produce a product. Supplier 104 may be any suitable entity that supplies at least one product to one or more customers 102. A supplier 104 may be associated with one or more factories 106, which produce the product supplied to customers 102. Factory 106 may be any appropriate entity that manufactures, fabricates, assembles, or otherwise produces a product for one or more suppliers 104. Reference to a "factory" is meant to include one or more associated factory operators or other personnel where appropriate. Although customer 102, supplier 104, and factory 106 may be described as separate and distinct entities, the same entity may act as a customer, supplier, and/or factory. For example, an entity may act as a customer 102 and purchase products from factory 106, and the same entity may act as a supplier 104 supplying the same or different products to other customers 102.

Each factory 106 includes one or more resources 108. Resources 108 may represent processing lines, equipment associated with processing lines, labor associated with processing lines, or other suitable resources used to process one or more items. A resource 108 may perform at least one operation on one or more items during production of a product.

In one embodiment, customers 102 may place orders for one or more products produced by a factory 106. Factory 106 may receive the orders directly from customers 102 or indirectly through a supplier 104 or other suitable entity. Factory 106 may use the orders from customers 102 to determine a production schedule. The production schedule may identify, for example, which items to produce, the quantities of each item to produce, and the times during which each item will be produced. A breakout server 110 may take the production schedule and determine which orders from customers 102 correspond to the items being produced during the scheduled production period. For example, server 110 may determine that the first one hundred units of an item produced during a production period correspond to an order from a first customer 102, and the next three hundred units of the items correspond to an order from a second customer 102. The operations performed by server 110 to determine which product orders correspond to the items being produced during a production period may be referred to as "breakout operations." This allows factory 106 to identify which product order is being filled by the items being produced at a particular time, which may also allow factory 106 to more accurately estimate when a particular customer's order will be completed. Also, a customer 102 may know when its items are being produced, giving the customer 102 more visibility into the supply chain.

In the illustrated embodiment, factory 106 includes breakout server 110 and database 112. Server 110 may process information stored in database 112 and perform breakout operations on behalf of factory 106. In the illustrated embodiment, server 110 includes a processor 114 and a memory 116. Other embodiments of breakout server 110 may be used without departing from the scope of the present invention.

Server 110 includes a processor 114 coupled to a memory 116. In this document, the term "couple" refers to any direct or any indirect communication between two or more elements, whether or not those elements are in physical contact with one another. Processor 114 executes instructions and manipulates data to perform the demand breakout functions of server 110. Processor 114 may be any processor suitable to perform demand breakout functions. Although FIG. 1 illustrates a single processor 114 in server 110, multiple processors 114 may be used according to particular needs.

Memory 116 stores and facilitates retrieval of information used by processor 114 to perform the demand breakout functions of server 110. Memory 116 may, for example, store instructions to be performed by processor 114 and data used by processor 114. Memory 116 may include any hardware, software, firmware, or combination thereof suitable to store and facilitate retrieval of information. Although FIG. 1 illustrates memory 116 as residing within server 110, memory 116 may reside at any location or locations accessible by processor 114.

Database 112 is coupled to server 110. Database 112 stores and facilitates retrieval of information used by server 110 to perform breakout operations in system 100. Database 112 may comprise any of a variety of data structures, arrangements, and/or compilations suitable to store and facilitate retrieval of information. Although FIG. 1 illustrates database 112 as residing within factory 106, database 112 may reside in any suitable location or locations accessible by server 110. Database 112 may include any hardware, software, firmware, or combination thereof suitable to store and facilitate retrieval of information.

Database 112 may store and processor 114 may process any suitable information to perform breakout operations in system 100. The following examples are for illustration only. Any other and/or additional types of information may be used without departing from the scope of the present invention. Also, the information stored in database 112 may be received using any suitable method. For example, a user could provide some or all of the information to server 110 using a workstation or other computing device coupled directly to server 110, server 110 could automatically generate some or all of the information, or some or all of the information could be supplied to server 110 by autonomous enterprise systems associated with customer 102, supplier 104, factory 106, or other suitable entity.

In one embodiment, database 112 stores product order information 118. Order information 118 may identify one or more orders for products from customers 102. For example, order information 118 may identify a product that a customer 102 orders, a quantity of the product ordered, and the date by which the product should be delivered. Order information 118 may also include inventory orders for a product from a factory 106 and/or a supplier 104. For example, factory 106 may wish to produce a quantity of a product for use as inventory, and order information 118 may identify the product that factory 106 requests, a quantity of the product, and the date by which the product should be produced. Order information 118 may include orders for one product or for multiple products, and the orders may come from one or multiple customers 102, one or multiple suppliers 104, and/or one or multiple factories 106. Other and/or additional order information may be used without departing from the scope of the present invention.

Database 112 may also store production information 120. Production information 120 may, for example, identify the item or items that a resource 108 is scheduled to produce during a production period. A resource 108 may be scheduled to produce a single item or multiple items during the production period. Production information 120 may also identify the quantity of each item to be produced during the production period. Production information 120 may further identify the time period during which the items will be produced during the production period. For example, in one embodiment, a production period is divided into windows or "buckets" of time, and production information 120 identifies the time buckets during which an item will be produced. In addition, the production information 120 may identify the next resource 108 to process an item. For example, a resource 108 may produce one item, and that item may be further processed by another resource 108. As a particular example, a first resource 108 may produce one thousand units of a chemical, and a second resource 108 may process and transform that chemical into another chemical. Production information 120 may identify that the first resource 108 will produce the chemical and that the second resource 108 will receive the chemical after it has been produced. Other and/or additional production information may be used without departing from the scope of the present invention.

In one embodiment, production information 120 identifies one or more "flows" in the supply chain. A "flow" represents a particular quantity of a particular item that becomes available during a particular time bucket. The flow travels from a source or production resource 108, which produces the item, to a target or destination resource 108, which receives and processes the item. For example, a flow might represent one thousand units of a chemical that is produced during the seventh time bucket of a production period. The chemical may be produced by a first resource 108 and then delivered to a second resource 108 for processing during the eighth time bucket, such that the flow travels from the first resource 108 to the second resource 108.

Database 112 may further store bill of materials (BOM) information 122, which identifies the items needed to produce a product. For example, bill of materials information 122 may identify the components or precursors of a product. In this document, the term "precursor" refers to an item that is used to produce another item in system 100. For example, charcoal, sulfur, and potassium nitrate are used to producing gunpowder, so these three materials are components or precursors of gunpowder. Bill of materials information 122 may identify which precursors are used to produce an item. Bill of materials information 122 may also identify how much of each precursor is needed to produce the item. The information may have any suitable form, such as a quantity of each precursor needed to produce a quantity of the item or a ratio of the precursors needed to make the item. Continuing with the example above, bill of materials information 122 may identify that one unit of gunpowder is ten percent sulfur, fifteen percent charcoal, and seventy-five percent potassium nitrate. Other and/or additional bill of materials information may be used without departing from the scope of the present invention.

In addition, database 112 may store preference information 124, which identifies preferences of a user that processor 114 may consider in determining which items produced by resources 108 correspond to a product order. For example, in one embodiment, processor 114 may process orders from customers 102, and more than one order may request the same product. The sequence in which processor 114 processes the product orders affects how items are allocated to product orders by server 110. For example, if multiple resources 108 produce the same item but one of the resources 108 produces a higher-quality item, the sequence of the product orders processed by server 110 may affect which customer 102 receives the higher-quality item. As a particular example, the first product order that requests the item may receive the higher-quality item, while the remaining product orders receive the lower-quality item. As a result, the sequence of the product orders processed by server 110 determines which customer 102 receives the higher-quality item. Because the sequence of the product orders affects how items are allocated to those orders, a user may wish to specify how server 110 should process the orders. Preference information 124 may identify the different characteristics or attributes of an order and how important those characteristics are to the user. Server 110 may use preference information 124 to rank the orders and then process the orders according to their rank. For example, a user may indicate that the importance of a customer 102 is the major factor in ranking product orders, and the priority of a product order is a secondary factor in ranking product orders. Server 110 may rank the product orders according to these criteria and then allocate items to the orders according to their rank. Other and/or additional preference information 124 may be used without departing from the scope of the present invention.

Server 110 may use the above and/or other information m any suitable combination to perform demand breakout operations in system 100. For example, in one embodiment, server 110 receives a production schedule for the supply chain. The production schedule may identify the items to be produced in a production period, the resources 108 that will produce the items, the time buckets during which the items will be produced, and the quantities of the items. The production schedule may also identify the various flows of items between resources 108 in the supply chain. Server 110 may store this information as production information 120 in database 112. Server 110 may receive the production schedule from another component or system in system 100. Server 110 may also produce the production schedule, such as by executing an appropriate factory planning engine.

To perform demand breakout operations, server 110 accesses order information 118 to identify the various product orders received from customers 102, suppliers 104, and/or factories 106. Server 110 then identifies which unit or units of the items produced by resources 108 correspond to the product orders. In this document, the term "unit" may refer to any suitable quantity of an item, and one unit of an item may represent a single item, a group of items, or any other suitable quantity. In a particular embodiment, server 110 identifies which item units correspond to the product orders by allocating or assigning flows or portions of flows to the product orders. For example, a flow from a first resource 108 to a second resource 108 may represent five hundred units of a chemical used to produce a finished end product. Server 110 may allocate the first two hundred units of the chemical to one product order and the next three hundred units to a second product order. By allocating flows or portions of flows to particular product orders, factory 106 may be able to identify which product order is being filled by the items being produced at a particular time. For example, the operator of factory 106 may know that the first two hundred units of the chemical will be used to produce products for a first customer 102 and the next three hundred units will be used to produce products for a second customer 102. This may allow factory 106 to more accurately estimate when a particular customer's order will be completed. In addition, a customer 102 may gain more visibility into the supply chain by knowing when its products are being produced.

In one embodiment, server 110 may use preference information 124 to control how items are allocated to product orders. For example, in one embodiment, server 110 uses events to allocate flows of items to the product orders. The events represent objects that are executed by server 110, and server 110 may allocate flows of items to product orders when executing the events. In this embodiment, server 110 may rank the events before executing them. Server 110 may use preference information 124 in any suitable manner to rank the events. In a particular embodiment, one or more characteristics are associated with each customer 102 and/or product order. For example, each product order may be associated with a value identifying the priority of the order and a value identifying the importance of the customer 102 that ordered the product. Preference information 124 may also identify a weight assigned to each of these characteristics. For example, preference information 124 may include a weight of seventy-five percent for the customer importance characteristic and a weight of twenty-five percent for the order priority characteristic. In this embodiment, server 110 may determine a weighted average associated with each event using the information associated with the product order and/or the customer 102. Server 110 may then process the events according to their rank, such as in order of decreasing weighted average. Other methods of ranking events may be used without departing from the scope of the present invention.

Although FIG. 1 illustrates an example embodiment of system 100, various changes may be made without departing from the scope of the present invention. For example, the components of server 110 may operate on one or more computers at one or more locations. Also, the functionality of server 110 may be implemented using any suitable computing device or devices, such as a server computer, a workstation, a desktop or laptop personal computer, or a personal digital assistant. Further, although server 110 is described primarily as being separate from customers 102 and suppliers 104, server 110 may share one or more computing or other appropriate resources with one or more customers 102 or suppliers 104 according to particular needs. Server 110 could also perform demand breakout operations for more than one factory 106. In addition, server 110 could operate separately from factory 106, operating within customer 102, supplier 104, or other location. Other changes may be made to system 100 without departing from the scope of the present invention.

FIG. 2 illustrates an example production table 200. Production table 200 may contain information defining a production schedule, which identifies how resources 108 in system 100 may be used to produce items during a production period. Production information table 200 may, for example, be stored in system 100 as production information 120. In the illustrated embodiment, table 200 includes one or more entries 202. Each entry 202 identifies an item 204, a quantity 206, a bucket 208, one or more precursors 210, a production resource 212, and a target resource 214. Other embodiments of table 200 may be used without departing from the scope of the present invention.

Item 204 identifies an item being produced by production resource 212 in system 100. Quantity 206 identifies the quantity of the item 204 being produced by production resource 212. Bucket 208 identifies the time bucket in the production period during which item 204 is being produced by production resource 212. Precursors 210 identify one or more precursors, or items, needed to produce item 204. Production resource 212 identifies the resource 108 in system 100 that is producing item 204. Target resource 214 identifies the resource 108 in system 100 that will receive the item 204 being produced by production resource 212. In one embodiment, each entry 202 corresponds to a different flow in system 100. Each entry 202 represents a particular quantity 206 of a particular item 204 that becomes available during a particular time bucket 208, and which travels between a source resource 212 and a target resource 214. As a result, table 200 identifies the flow of items 204 through resources 108 of system 100.

Server 110 may receive information 204-214 contained in table 200 from another component in system 100, server 110 may generate the information 204-214, or server 110 may obtain the information 204-214 in any other suitable manner. For example, server 110 may generate information 204-214 by executing an appropriate factory planning engine. Although FIG. 2 illustrates an example embodiment of a production table 200, various changes may be made to table 200 without departing from the scope of the present invention. For example, information may be added to or removed from table 200 without departing from the scope of the present invention. Also, although FIG. 2 illustrates information 204-214 being stored in a table 200, server 110 could use any other suitable data structure or structures to store the information 204-214. Other changes may be made without departing from the scope of the present invention.

FIG. 3 illustrates an example bill of materials (BOM) table 300. Bill of materials table 300 may contain information identifying how a resource 108 may produce an item 204. Bill of materials table 300 may, for example, be stored in system 100 as bill of materials information 122. In the illustrated embodiment, Table 300 includes one or more entries 302, and each entry 302 identifies a precursor 210 and a quantity 304. Other embodiments of table 300 may be used without departing from the scope of the present invention.

As described above, a resource 108 produces an item 204 using at least one precursor 210. A resource 108 may receive one or more precursors 210, process the precursors 210, and produce the item 204. Each entry 302 identifies one precursor 210 needed to produce an item 204. Each entry 302 also identifies the quantity 304 of the precursor 210 needed to produce one unit of the item 204. In the illustrated embodiment, three precursors 210 are needed to produce the item 204. Two units of the first precursor H, one-half of a unit of the second precursor I, and one unit of the third precursor J are needed to produce one unit of the item 204. In one embodiment, each item 204 produced in system 100 has one bill of materials table 300. In another embodiment, an item 204 produced in system 100 may have multiple bill of materials tables 300. In this embodiment, system 100 may use different precursors 210 and/or different quantities 304 of precursors 210 to produce the same item 204.

Although FIG. 3 illustrates one example of a bill of materials table 300 various changes may be made to table 300 without departing from the scope of the present invention. For example, any suitable number of entries 302 may be used in table 300. Also, while table 300 uses quantities 304 to identify the amount of precursors 210 needed to produce an item 204, other measurements may be used. For example, the relative percentages of precursors 210 may be used in addition to and/or in place of the quantities 304 in table 300. As a particular example, table 300 could indicate that the first precursor 210 forms fifty-seven percent of the item 204 being produced, the second precursor 210 forms fourteen percent of the item 204 being produced, and the third precursor 210 forms twenty-nine percent of the item 204 being produced.

FIG. 4 illustrates an example preference table 400. In one embodiment, server 110 allocates flows of items 204 to product orders by generating and executing events. In this embodiment, the order in which in which server 110 executes the events may determine how items 204 are allocated to the product orders. In a particular embodiment, server 110 ranks the events and then processes the events according to their rank. Preference table 400 may contain information identifying how server 110 ranks the events. Preference table 400 may, for example, be stored in system 100 as preference information 124. In the illustrated embodiment, table 400 includes one or more entries 402. Each entry 402 identifies an attribute 404 and a weight 406. Other embodiments of table 400 may be used without departing from the scope of the present invention.

In one embodiment, server 110 uses the information in preference table 400 to rank events. An attribute 404 identifies a characteristic of a product order and/or an entity that placed the order. For example, an attribute 404 may represent the importance of the customer 102, supplier 104, or factory 106 that placed the product order. An attribute 404 may also represent the importance or priority of the product order. Other and/or additional attributes 404 may be used without departing from the scope of the present invention.

A weight 406 is associated with each attribute 404. The weight 406 of an attribute 404 identifies the relative importance of that attribute 404. For example, a user may indicate that server 110 should rank events based primarily on the importance of the entity placing the order and secondarily on the priority of the order. As a particular example, a user may wish to give preferential treatment to certain customers 102 over other customers 102, suppliers 104, and factories 106. The user may also wish to identify particular product orders as more important than other orders. Weights 406 indicate how server 110 may balance these competing interests. In one embodiment, each event has a value associated with each attribute 404. For example, an event may have a value identifying the priority of the order and a value identifying the importance of the customer 102 who placed the order. Server 110 may use the values associated with the events and the information contained in table 400 to determine a weighted average for the events. The weighted average for an event may be determined using the formula:

$$\Sigma_{i=1}^{Number\ of\ attributes}(\text{Attribute value of attribute } i)*(\text{Weight of attribute } i).$$

By multiplying the weight 406 of an attribute 404 by the value associated with that attribute 404 and summing the results over all attributes 404, server 110 may determine a weighted average for an event. Server 110 may then rank the events by weighted average and process the events according to their rank. For example, server 110 may process events having a higher weighted average first. In this manner, server 110 may incorporate a user's preferences into the demand breakout operations. This allows server 110 to assign items 204 to the product orders in different ways for different users, depending on the priorities of those users.

Although FIG. 4 illustrates one example of a preference table 400, various changes may be made to table 400 without departing from the scope of the present invention. For example, any number of attributes 404 may be used in table 400. Also, while weights 406 are illustrated in FIG. 4 as percentages, other representations of weights 406 may be used. In addition, while FIGS. 2-4 illustrate various information stored in tables 200-400, any other suitable data storage arrangements may be used without departing from the scope of the present invention.

Figure 5A:
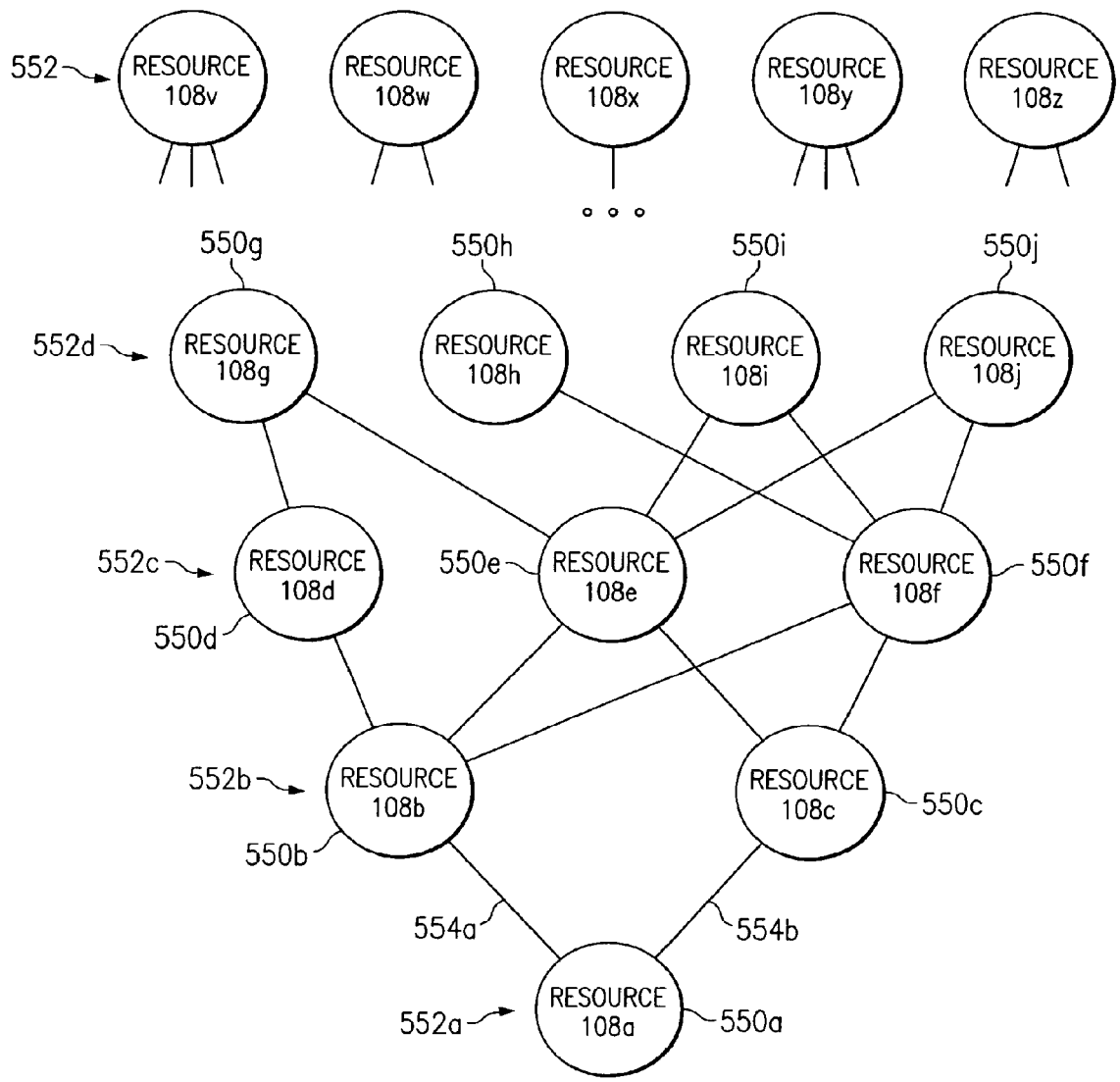
FIGS. 5A and 5B illustrate example models of resources In a supply chain.
Figure 5B:
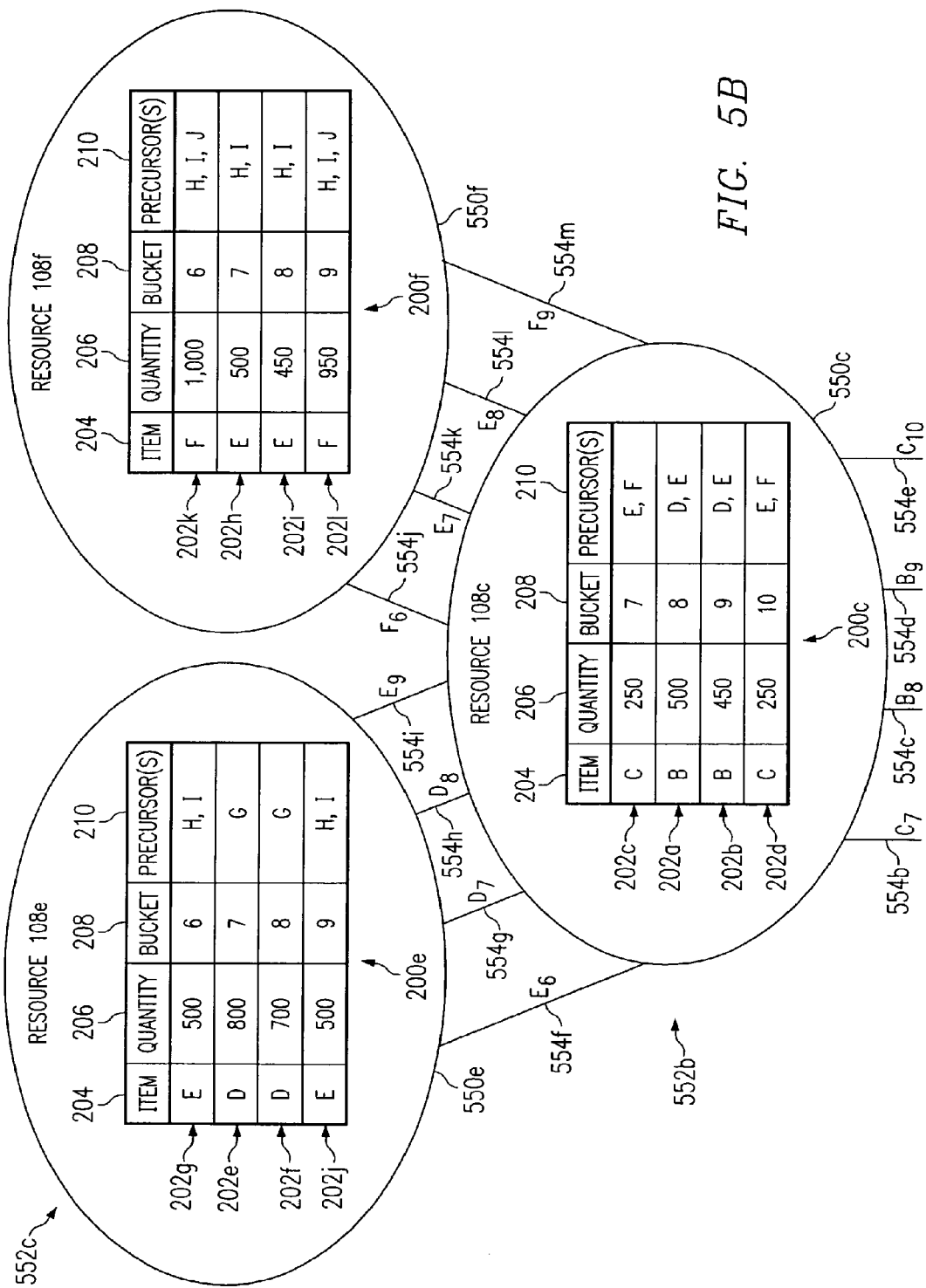

FIGS. 5A and 5B illustrate example models of resources 108 in a supply chain. In particular, FIG. 5A illustrates an example resource tree 500 representing an arrangement of resources 108 in system 100, and FIG. 5B illustrates example flows 554 of items 204 between resources 108 in system 100. The information shown in FIGS. 5A and 5B is for illustration only. Any suitable tree 500 and/or flows 554 may be used without departing from the scope of the present invention.

As illustrated in FIG. 5A, tree 500 includes a plurality of nodes 550. Each node 550 represents a resource 108 used to process one or more items 204 in system 100. Nodes 550 may be arranged in tree 500 in one or more layers 552. Layers 552 may represent a hierarchical arrangement of resources 108 during production of a product. For example, a resource 108 represented by a node 550 in one layer 552 may process items 204 received from higher layers 552 in tree 500. As a particular example, nodes 550i and 550j may represent resources 108i and 108j, respectively. Resources 108i and 108j may produce one or more items 204, which are then received and processed by the resource 108f represented by node 550f. Resource 108f may process the items 204 produced by resources 108i and 108j, along with any additional items 204 required by resource 108f. Resource 108f then produces one or more additional items 204, which are received and processed by resource 108b and resource 108c represented by node 550b and node 550c, respectively. The process continues down tree 500 until resource 108a represented by node 550a produces the finished end product.

Nodes 550 may be coupled by one or more flows 554. Each flow 554 represents a specified quantity 206 of a specified item 204 that becomes available at a specified time bucket 208. For example, a flow 554 may represent one thousand units of an item 204 that flows between resource 108c and resource 108a during the sixth time bucket 208 in a production period.

In one aspect of operation, server 110 allocates flows 554 and/or portions of flows 554 to product orders received from customers 102, suppliers 104, and/or factories 106. For example, server 110 may allocate flow 554a between node 550b and 550a to a product order received from customer 102a, and server 110 may allocate flow 554b between node 550c and node 550a to a product order received from customer 102b. This allows factory 106 to identify which product order is being filled by the items 204 produced by resources 108b and 108c. For example, the operator of factory 106 is able to determine that the item 204 being produced by resource 108b and flowing to resource 108a along flow 554a is for customer 102a. Similarly, the operator of factory 106 may determine that the item being produced by resource 108c and flowing along flow 554b is for customer 102b. This allows factory 106 to more accurately estimate when a particular customer's order will be completed. This also allows a particular customer 102 to know when its items 204 are being produced, which gives the customer 102 more visibility into the supply chain. In addition, the factory 106 may take additional steps during the production of an item 204 depending on the identity of a customer 102. For example, if server 110 allocates flow 554a to a more important customer 102 and flow 554b to a less important customer 102, factory 106 may perform additional quality control operations to ensure that the item 204 produced by resource 108b meets or exceeds quality expectations.

FIG. 5B illustrates additional details of a portion of resource tree 500 of FIG. 5A. In particular, FIG. 5B illustrates a portion of the flows 554 that exist during the production schedule illustrated in FIG. 2. For ease of illustration, production table 200 in FIG. 2 has been divided into three tables 200c, 200e, and 200f, which correspond to resources 108c, 108e, and 108f, respectively.

As shown in FIG. 5B, four flows 554 couple nodes 550e and 550c. These flows 554 exist because resource 108e produces items 204 during four time buckets 208. For example, resource 108e produces five hundred units of a first item E during the sixth time bucket 208. Because of this, resource 108c may receive and use the five hundred units of the first item 204 after the sixth time bucket 208, so a flow 554 exists between resource 108e and resource 108c. Similarly, three other flows 554 exist between resource 108e and resource 108c due to the production of items 204 during the other three time buckets 208 by resource 108e.

As described above, production table 200 lacks an identification of the product order that corresponds to the production of the various items 204 by resources 108. To identify which items 204 correspond to the product orders, server 110 allocates flows 554 to the product orders. For example, server 110 may determine that a product order requires two hundred fifty units of item C. By examining the flows 554 leaving resource 108c, server 110 may allocate flow 554b (labeled "$C_7$") to that product order since flow 554b represents two hundred fifty units of the needed item 204. Continuing up the tree 500, server 110 may determine that producing two hundred fifty units of item C requires five hundred units of item E and five hundred units of item F. Server 110 may make this determination, for example, using a bill of materials table for item C. By examining the flows 554 entering resource 108c, server 110 determines that flow 554f (labeled "$E_6$") contains the required quantity 206 of item E, so server 110 allocates flow 554f to the product order. Similarly, server 110 determines that flow 554j (labeled "$F_6$") contains more than the required quantity 206 of item F, so server 110 allocates one-half of flow 554j to the product order. Server 110 may continue up the resource tree 500, allocating all or portions of flows 554 to the product order.

In the above example, flows 554 contain enough quantities of precursors 210 to completely produce an item 204. In other situations, flows 554 may not contain enough quantities of one or more precursors 210 to completely produce an item 204. For example, using a bill of materials table for item B, server 110 may determine that producing five hundred units of item B requires two thousand units of precursor D and one thousand units of precursor E. As shown in FIG. 5B, resource 108c receives only fifteen hundred units of precursor D, represented by flows 554g and 554h, during the production period. As a result, resource 108c does not receive enough of precursor D to produce all of the five hundred units of item B.

In one embodiment, when inadequate quantities of one or more precursors 210 are flowing into a node 550, server 110 accesses bill of materials information 122 and identifies the precursor 210 that is most scarce. The precursor 210 that is most "scarce" is the precursor 210 that limits the production of an item 204 to the greatest degree. For example, if resource 108 could produce at most three hundred seventy-five units of an item 204 using a first precursor 210 and at most five hundred units of item 210 using a second precursor 210, the first precursor 210 would be more scarce than the second precursor 210. In the above example, precursor D limits the production of the five hundred units of item B more than precursor E. This is because a suitable quantity of precursor E is available, but not enough of precursor D is available.

After identifying the precursor 210 that is most scarce, server 110 may determine the fraction of the requested quantity 206 of the item 204 that can be produced. Server 110 may then reduce the amount of each precursor 210 to be allocated to a product order by that fraction. For example, if resource 108 can produce seventy-five percent of an item 204 using the scarce precursor 210, server 110 may reduce the quantity of each precursor 210 needed at resource 108 by twenty-five percent. In this way, server 110 may allocate the appropriate amount of each precursor 210 to a product order. Thus, in this embodiment, when less than the total quantity 206 of an item 204 can be produced, server 110 allocates the appropriate amount of precursors 210 to produce the item 204.

When an item 204 can be produced according to multiple bill of materials tables 300, server 110 may identify which bill of materials table 300 to use in allocating flows 554 to product orders. For example, server 110 may identify which bill of materials table 300 uses the least amount of a particular precursor 210. If flows 554 do not contain enough quantities of one or more precursors 210 to completely produce an item 204, server 110 may determine which bill of materials table 300 results in the production of the largest quantity of item 204. After identifying the bill of materials table 300, server 110 uses that table 300 to allocate one or more flows 554 to a product order.

Although FIGS. 5A and 5B illustrate one example of a resource tree 500 and flows 554 within the tree 500, various changes may be made to tree 500 and/or flows 554 without departing from the scope of the present invention. For example, tree 500 may include any number of layers 552, and each layer 552 may include any number of nodes 550. Also, any number of flows 554 may couple nodes 550 in tree 500. Further, the information contained in nodes 550 is for illustration only. Any other and/or additional information may be used without departing from the scope of the present invention. In addition, although FIGS. 5A and 5B illustrate each node 550 corresponding to a different resource 108, the same resource 108 may be represented by multiple nodes 550. For example, a resource 108 may be used to produce a precursor 210 during early time buckets 208, and during later time buckets 208 the same resource 108 may be used to produce a final end product.

Figure 6A:
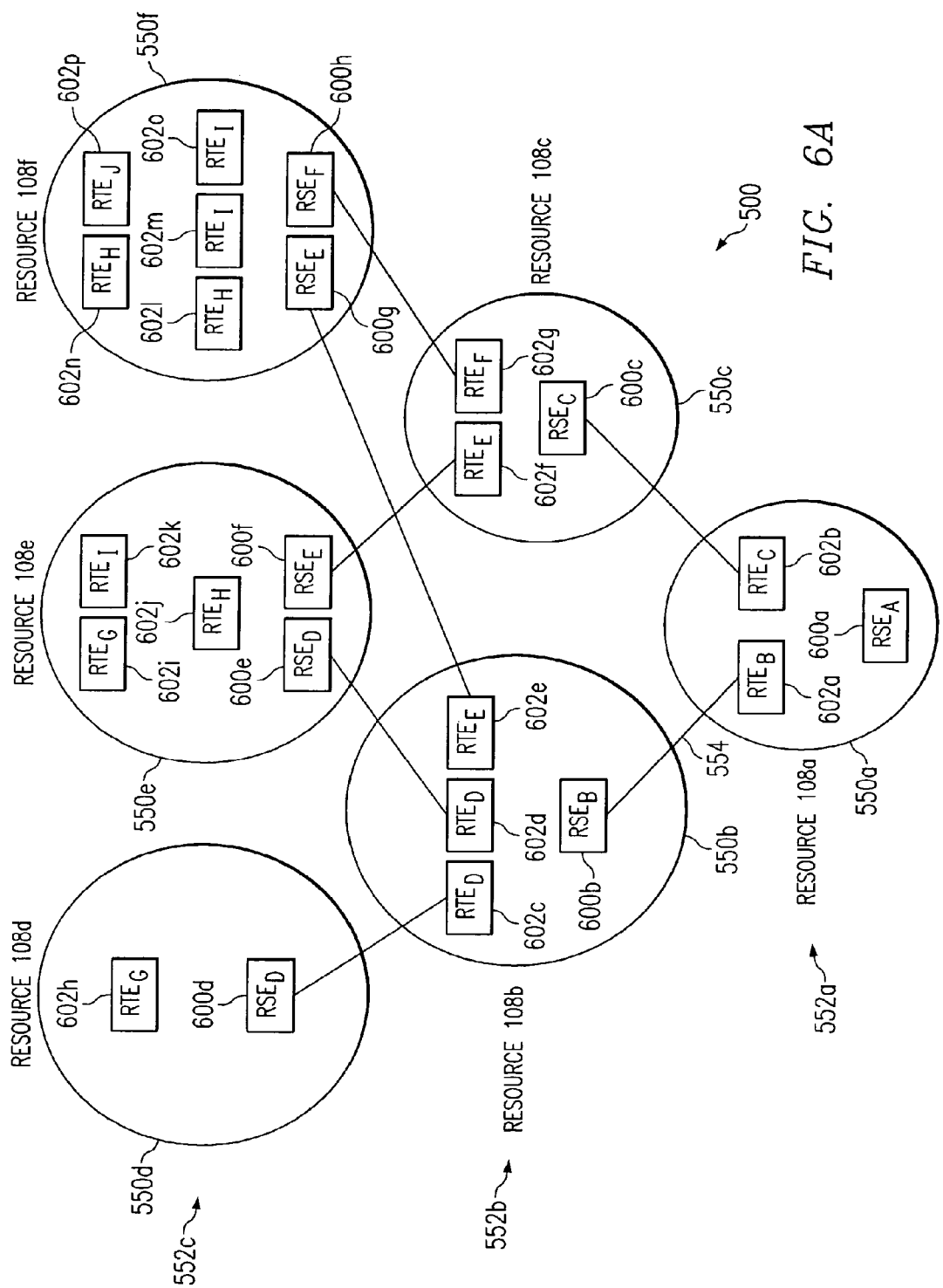

FIGS. 6A and 6B illustrate example events 600, 602 used to allocate items 204 to product orders in a supply chain. In particular, FIG. 6A illustrates how events 600, 602 may be propagated through resource tree 500, and FIG. 6B illustrates a hierarchical arrangement of events 600 in system 100. In one embodiment, events 600, 602 represent objects that are executed by server 110. In the illustrated embodiment, two types of events 600, 602 may be used in system 100 to allocate flows 554 to product orders. One type of event is a requirement satisfaction event (RSE) 600, and another type of event is a requirement transmission event (RTE) 602. Other and/or additional events may be used in system 100 without departing from the scope of the present invention.

A requirement satisfaction event 600 represents a request for a specified quantity of a particular item 204 at a specified node 550 during a particular time bucket. For example, a requirement satisfaction event 600 may represent a request for one thousand units of an item at node 550f during the sixth time bucket 208. When server 110 executes a requirement satisfaction event, server 110 accesses bill of materials information 122 and identifies the precursors 210 needed to produce the item requested by event 600. Server 110 may also identify the quantity of each precursor 210 needed to produce the item requested by event 600. Server 110 scans the flows 554 entering the node 550 associated with event 600. Server 110 attempts to identify which flows 554, if any, can be used to produce the item requested by event 600. This may include, for example, server 110 determining whether any of the flows 554 involve one of the precursors 210 needed to produce the item, and whether the precursor represented by flow 554 will arrive at node 550 at the appropriate time.

In one embodiment, if server 110 locates a flow 554 that supplies a precursor 210 to a node 550 at the appropriate time, server 110 allocates all or a portion of that flow 554 to the product order associated with event 600. When server 110 allocates at least a portion of a flow 554 to a product order, server 110 generates a requirement transmission event 602. The requirement transmission event 602 identifies the flow 554 being allocated to a product order, the precursor 210 associated with that flow 554, and the quantity of the precursor 210 allocated to the product order. When server 110 executes the requirement transmission event 602, the requirement transmission event 602 generates a requirement satisfaction event 600 at the other end of flow 554. Server 110 may then repeat the process, executing the new requirement satisfaction event 600 in the next node 550 to generate one or more additional requirement transmission events 602.

In one embodiment, server 110 begins allocating flows 554 to products orders by executing a requirement satisfaction event 600 on the first level 552 of tree 500. The requirement satisfaction event 600 generates one or more requirement transmission events 602. When executed, the requirement transmission events 602 generate more requirement satisfaction events 600 on the next level 552 of tree 500. Server 110 then continues to the next level 552 and executes the new requirement satisfaction events 600. This may generate new requirement transmission events 602, which in turn may generate more requirement satisfaction events 600 on the next level 552 of tree 500. This process may continue until the flows 554 entering a node 550 cannot satisfy a requirement satisfaction event 600 for that node 550.

In the illustrated embodiment, server 110 begins allocating flows 554 to a product order by executing a requirement satisfaction event 600a at node 550a. The requirement satisfaction event 600a represents a request for a quantity of a product produced by resource 108a in system 100. Server 110 executes the requirement satisfaction event 600a by accessing bill of materials information 120 and identifying the precursors 210 needed by resource 108a to produce the finished product. In the illustrated embodiment, the finished product (product A) uses two precursors 210, item B and item C. Server 110 also determines the quantity of each precursor 210 needed to produce the requested quantity of the finished product. Server 110 scans the flows 554 entering node 550a and determines if any of the flows 554 involve the needed precursors 210. Server 110 may determine that a flow 554 from node 550b satisfies the requirement for item B, and that a flow 554 from node 550c satisfies the requirement for item C. Server 110 generates a requirement transmission event 602a to reserve the quantity of item B and a requirement transmission event 602b to reserve the quantity of item C. Server 110 then executes requirement transmission events 602a and 602b, which generate requirement satisfaction events 600b and 600c, respectively.

Server 110 then continues up tree 500 and executes requirement satisfaction events 600b and 600c. Production of item B requires quantities of item D and item E. When executing requirement satisfaction event 600b, server 110 generates requirement transmission events 602c and 602d to reserve quantities of item D and a requirement transmission event 602e to reserve a quantity of item E. Production of item C requires quantities of item E and item F. When executing requirement satisfaction event 600c, server 110 generates a requirement transmission event 602f to reserve a quantity of item E and a requirement transmission event 602g to reserve a quantity of item F. This process continues up the resource tree 500, with server 110 generating requirement satisfaction events 600 to allocate flows 554 to a product order and requirement transmission events 602 generating requirement satisfaction events 600 on the next level 552 of tree 500.

While FIG. 6A illustrates the events 600, 602 that may be used to allocate flows 554 to one product order, server 110 may use the same or a similar process to allocate flows 554 to multiple product orders. For example, server 110 may execute multiple requirement satisfaction events 600 at node 550a. Each of the requirement satisfaction events 600 may produce a set of requirement transmission events 602 at node 550a. Each set of requirement transmission events 602 may generate a set of requirement satisfaction events 600 in the next layer 552 of tree 500. This process may continue until all the flows 554 have been allocated to the product orders and/or the requirement satisfaction events 600 cannot be satisfied with the current flows 554.

FIG. 6B illustrates a hierarchical arrangement of the requirement satisfaction events 600 in resource tree 500. In particular, FIG. 6B illustrates example requirement satisfaction events 600 that may be used when server 110 allocates flows 554 to two product orders. The two product orders are represented in FIG. 6B by two requirement satisfaction events 600 in the first level 552a of tree 500. Each requirement satisfaction event 600 requests a quantity of a finished product. Server 110 executes the requirement satisfaction events 600 and generates a second layer 552b of requirement satisfaction events 600. Server 110 executes the second layer 552b of requirement satisfaction events 600 and generates a third layer 552c of requirement satisfaction events 600. This process continues through tree 500 until no more requirement satisfaction events 600 are generated.

The flows 554 that server 110 allocates to a particular product order depend, at least in part, on the order in which the requirement satisfaction events 600 are executed by server 110. For example, resources 108 may only have the capacity to produce a quantity of an item 204, such as item C, for one product order. The product order that receives the quantity of item 204 depends on which requirement satisfaction event 600 in layer 552a that server 110 executes first. As a particular example, if server 110 executes requirement satisfaction event 600a first, a first customer 102 may have its order met by factory 106. If server 110 executes requirement satisfaction event 600i first, a second customer 102 may have its order met by factory 106.

In one embodiment, server 110 ranks the requirement satisfaction events 600 and executes the events 600 by rank. In a particular embodiment, each event 600 is associated with one or more attributes 404. The attributes 404 may, for example, include the importance of the entity that placed the product order associated with event 600 and the priority of the product order. For each attribute 404, a value is assigned to the event 600. For example, the values might indicate that the product order associated with event 600 has been placed by an important customer 102, and the product order is a high priority for factory 106. Using these values and the weights 406 associated with attributes 404, server 110 may generate a weighted average for each event 600. Server 110 may then order the events 600, such as by decreasing weighted average, and execute the events 600 in order. By ranking events 600, server 110 may incorporate a user's preferences into the demand breakout operations. This allows server 110 to assign flows 554 to the product orders in different ways for different users based, at least in part, on the priorities of those users.

While FIGS. 6A and 6B illustrate example events 600, 602 used to allocate flows 554 to product orders, various changes may be made to FIGS. 6A and 6B without departing from the scope of the present invention. For example, any suitable number of requirement satisfaction events 600 and/or requirement transmission events 602 may be used in system 100. Also, any number of layers 552 may be used. Further, a requirement satisfaction event 600 may generate any suitable number of requirement transmission events 602. Other changes may be made without departing from the scope of the present invention.

FIG. 7 illustrates an example method 700 for demand breakout for a supply chain. Server 110 receives or otherwise accesses orders for a product at step 702. This may include, for example, server 110 receiving product orders for a product from one or more customers 102, suppliers 104, and/or factories 106. The product order may represent an order for a quantity of a product to be delivered to a customer 102. The product order could also represent a quantity of a product to be used as inventory, such as a safety stock for a factory 106 or supplier 104. Server 110 may store the product orders as order information 118 in database 112.

Server 110 receives or otherwise accesses a production schedule for the supply chain at step 704. This may include, for example, server 110 receiving a production table 300 which identifies the items 204 to be produced by resources 108, the quantities 206 of the items 204 to be produced, the time buckets 208 during which the items 204 will be produced, and the precursors 210 needed to produce the items 204. Server 110 may store the production schedule as production information 120 in database 112.

Server 110 allocates at least a portion of the product to one or more product orders at step 706. This may include, for example, server 110 generating a requirement satisfaction event 600 for each of the product orders. This may also include server 110 identifying one or more particular units of the product that correspond to each product order. For example, server 110 may determine that the first one thousand units of a product that are produced correspond to a first product order, the next five hundred units of a product produced correspond to a second product order, and the remaining units of the product correspond to a third product order.

Server 110 allocates at least a portion of one or more precursors 210 to the product orders at step 708. This may include, for example, server 110 executing the requirement satisfaction events 600 generated during step 706. This may also include the requirement satisfaction events 600 generating requirement transmission events 602 as server 110 allocates all or portions of one or more flows 554 to the product orders. This may further include the requirement transmission events 602 generating additional requirement satisfaction events 600 in another layer 552 in resource tree 500. By executing the requirement satisfaction events 600 and the requirement transmission events 602, server 110 allocates one or more flows 554, which represent one or more particular units of items 204, to the product orders. As a result, factory 106 may identify which product order corresponds to the production of each item 204 in system 100.

Although FIG. 7 illustrates one example of a method 700 for demand breakout, various changes may be made to method 700 without departing from the scope of the present invention. For example, server 110 may receive the production schedule at step 704 from another component in system 100, server 110 may generate the production schedule, or server 110 may receive the production schedule in any other suitable manner.

Figures 8, 9:
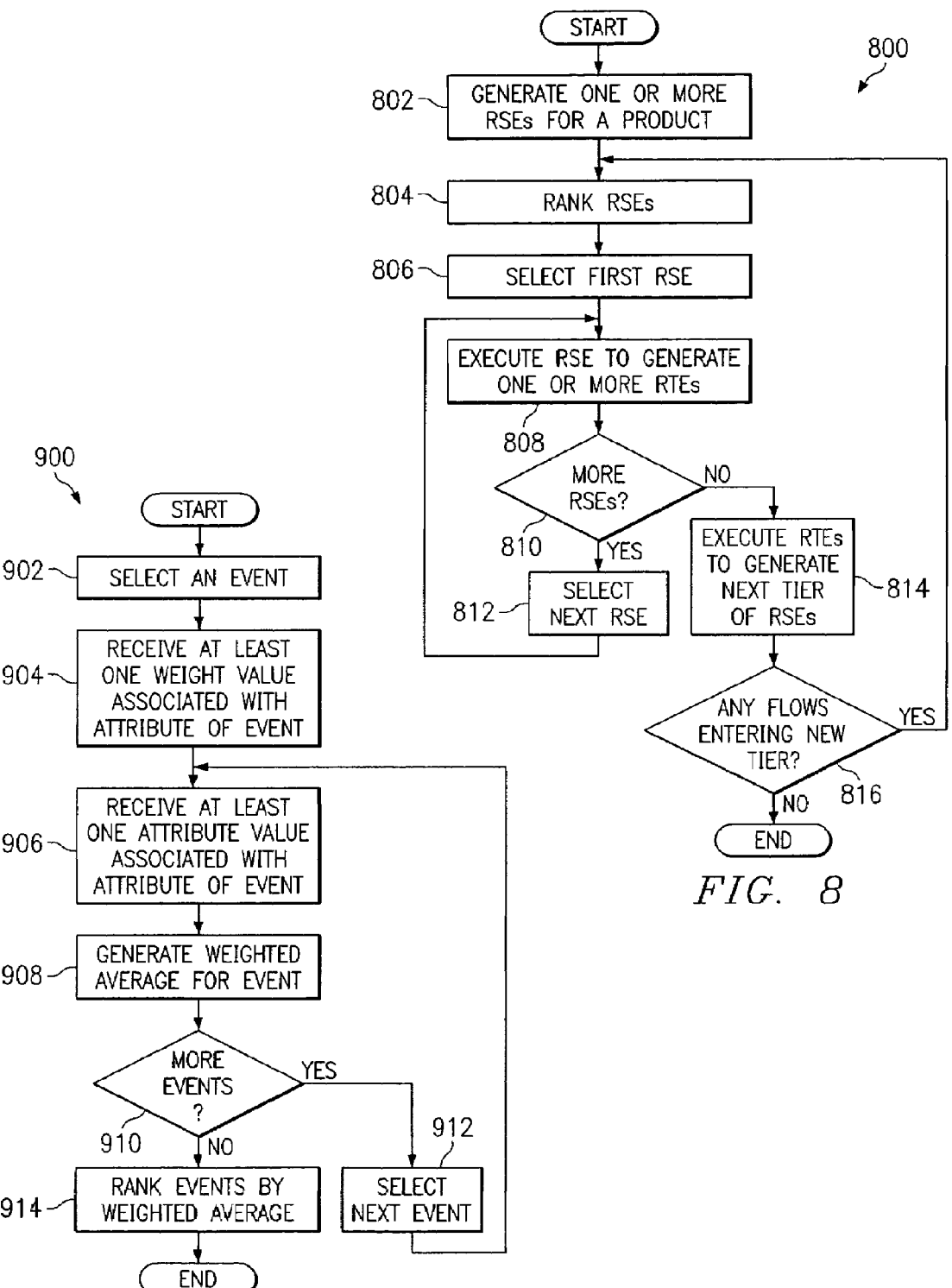
FIG. 8 illustrates an example method for allocating items to a product order.
FIG. 9 illustrates an example method for ranking events in a supply chain.

FIG. 8 illustrates an example method 800 for allocating items 204 to a product order. Method 800 may, for example, be used during step 708 in method 700 to allocate flows 554 of items 204 to the product orders.

Server 110 generates one or more requirement satisfaction events 600 for a product at step 802. This may include, for example, server 110 generating a requirement satisfaction event 600 for each product order. This may also include server 110 generating the requirement satisfaction events 600 at the node 550 representing the resource 108 that produces the product. For example, if a resource 108a produces a final product being ordered by a customer 102, server 110 may generate the requirement satisfaction event 600 at node 550a.

Server 110 ranks the requirement satisfaction events 600 at step 804. This may include, for example, server 110 generating a weighted average for each of the requirement satisfaction events 600. In one embodiment, each requirement satisfaction event 600 is associated with one or more attributes 404, such as the importance of the entity that placed a product order and the priority of the product order. For each of these attributes 404, an attribute value is associated with the requirement satisfaction event 600. The attribute value may, for example, identify the importance of the entity that placed the product order and the priority of the product order. Using the attribute values and the weights 406 associated with attributes 404, server 110 may generate a weighted average for each requirement satisfaction event 600. Server 110 may then rank the requirement satisfaction events 600, such as in order of decreasing weighted average.

Server 110 selects the first requirement satisfaction event 600 at step 806. This may include, for example, server 110 selecting the requirement satisfaction event 600 with the largest weighted average. Server 110 executes the requirement satisfaction event at step 808. This may include, for example, server 110 accessing bill of materials information 122 in database 112 and identifying the precursors 210 needed to produce the item 204 requested by the requirement satisfaction event 600. This may also include server 110 examining the flows 554 entering the node 550 at which the requirement satisfaction event 600 is being executed. This may further include server 110 generating one or more requirement transmission events 602 to allocate a part or all of a flow 554 to a product order. Server 110 determines whether any remaining requirement satisfaction events 600 remain to be executed at step 810. If additional requirement satisfaction events 600 exist, server 110 selects the next requirement satisfaction event 600 at step 812. This may include, for example, server 110 selecting the requirement satisfaction event 600 with the next highest weighted average. Server 110 then returns to step 808 to execute the selected requirement satisfaction event 600.

Once the requirement satisfaction events 600 have been executed, server 110 executes the requirement transmission events 602 at step 814. These requirement transmission events 602 were generated when server 110 executed the requirement satisfaction events 600 during step 808. The execution of the requirement transmission events 602 produces one or more requirement satisfaction events 600 on the next layer or tier 552 of resource tree 500.

Server 110 determines whether any flows 554 are entering the new layer 552 of resource tree 500 at step 816. If one or more flows 554 enter a node 550 on the next level 552 of resource tree 500, server 110 returns to step 804 to rank the new requirement transmission events 600. Server 110 may then repeat steps 806-814 to execute the new level of requirement transmission events 600. This process continues until server 110 can no longer execute a requirement satisfaction event 600. At that point, no flows 554 are available to satisfy the requirement satisfaction events 600.

Although FIG. 8 illustrates one example of a method 800 for allocating flows 554 to product orders, various changes may be made to method 800 without departing from the scope of the present invention. For example, server 110 could execute requirement satisfaction events 600 without ranking the events 600 at step 804. Also, FIG. 8 illustrates method 800 as executing all requirement satisfaction events 600 in one level 552 of resource tree 500 before executing the requirement satisfaction events 600 on the next level 552 of resource tree 500. Server 110 could also execute a first requirement satisfaction event 600 on level 552*a* of resource tree 500 and propagate that event 600 through the remaining levels 552 of resource tree 500, before executing the next requirement satisfaction event 600 on level 552*a*. In addition, server 110 could rank the requirement transmission events 602 and then execute the requirement transmission events 602 at step 814 according to their rank.

FIG. 9 illustrates an example method 900 for ranking events 600, 602 in a supply chain. Although method 900 may be described as ranking requirement satisfaction events 600, the same or similar method may be used to rank requirement transmission events 602 or any other suitable event in system 100.

Server 110 selects an event 600 at step 902. This may include, for example, server 110 selecting the first event 600 on a level 552 of resource tree 500. Server 110 receives at least one weight 406 associated with an attribute 404 of event 600 at step 904. This may include, for example, server 110 accessing preference table 400 and retrieving one or more attributes 404 and weights 406 from table 400.

Server 110 receives at least one attribute value associated with an attribute 404 of event 600 at step 906. This may include, for example, server 110 receiving a value identifying the importance of the entity that placed the product order associated with event 600 and/or a value identifying the priority of the product order. Server 110 generates a weighted average for the requirement satisfaction event 600 at step 908. This may include, for example, server 110 multiplying the attribute value associated with an attribute 404 by the weight 406 of that attribute 404, and summing the results over all the attributes 404.

Server 110 determines whether more requirement satisfaction events 600 remain to be processed at step 910. This may include, for example, server 110 determining whether a weighted average has been generated for each requirement satisfaction event 600. If more requirement satisfaction events 600 remain, server 110 selects the next event 600 at step 912. Server 110 then returns to step 906 and generates a weighted average for the next event 600. This process continues until a weighted average has been generated for each requirement satisfaction event 600. Server 110 then ranks events 600 by their weighted average at step 914. This may include, for example, server 110 ranking the events 600 in order of decreasing weighted average.

Although FIG. 9 illustrates one example of a method 900 for ranking events 600, various changes may be made to method 900 without departing from the scope of the present invention. For example, server 110 could receive all of the attribute values for all events 600 before generating the weighted averages for events 600. Also, server 110 could use any other suitable method for ranking events 600.

FIG. 10 illustrates an example method 1000 for executing an event 600 to allocate items 204 to a product order. Server 110 receives a requirement satisfaction event 600 for a product at step 1002. This may include, for example, server 110 receiving a product order and generating the requirement satisfaction event 600 for that product order. Server 110 identifies the precursors 210 and the quantities of those precursors 210 needed to produce the product requested by the requirement satisfaction event 600 at step 1004. This may include, for example, server 110 accessing bill of materials table 300 and identifying the quantity 304 of each precursor 210 needed to produce one unit of the product requested by the requirement satisfaction event 600. Server 110 selects the first precursor 210 at step 1006. Server 110 identifies the flows 554, if any, that contain the first precursor 210 at step 1008. This may include, for example, server 110 scanning the flows 554 that enter the node 550 associated with the requirement satisfaction event 600. This may also include server 110 determining if any of the flows 554 cannot be used because they represent items 204 produced during later time buckets 208 in the production period.

Server 110 determines whether more than one suitable flow 554 has been identified at step 1010. If only one flow 554 has been identified, server 110 generates a requirement transmission event 602 reserving a quantity of precursor 210 in that flow 554 at step 1012. If more than one suitable flow 554 exists at step 1010, server 110 selects one of the flows 554 at step 1014. Server 110 may select a flow 554 using any suitable method. For example, a user may indicate that server 110 should select flows 554 representing items 204 produced during earlier time buckets 208, and server 110 may select the flow 554 associated with the earliest time bucket 208. Server 110 then generates a requirement transmission event 602 reserving a quantity of precursor 210 at step 1016. This may include, for example, server 110 generating the requirement transmission event 602 for the selected flow 554. Server 110 determines whether additional quantities of precursor 210 are needed at step 1018. For example, the selected flow 554 may represent an inadequate quantity of a precursor 210. If more quantities of a precursor 210 are needed, server 110 returns to step 1014 and attempts to reserve additional quantities of a precursor 210 using other flows 554.

After generating one or more requirement transmission events 602 at step 1012 or step 1018, server 110 determines whether additional precursors 210 need to be processed at step 1020. This may include, for example, server 110 determining whether a requirement transmission event 602 has been produced for each precursor 210. If additional precursors 210 remain, server 110 selects the next precursor 210 at step 1022. Server 110 then returns to step 1008 to generate one or more requirement transmission events 602 for the new precursor 210. This process continues until server 110 has generated a requirement transmission event 602 for each precursor 210.

Although FIG. 10 illustrates one example of a method 1000 for executing an event 600, various changes may be made to method 1000 without departing from the scope of the present invention. For example, method 1000 illustrates the use of two events, a requirement satisfaction event 600 and a requirement transmission event 602, to allocate flows 554 to product orders. Other events may be used without departing from the scope of the present invention.

FIG. 11 illustrates an example method 1100 for identifying quantities of precursors 210 to be allocated to a product order. Server 110 receives a request for a quantity 206 of an item 204 at step 1102. This may include, for example, server 110 executing a requirement satisfaction event 600, which represents a request for a quantity 206 of item 204 at a node 550 in resource tree 500. Server 110 identifies the quantities of the precursors 210 needed to produce all of the requested item 204 at step 1104. This may include, for example, server 110 accessing bill of materials table 300, retrieving the quantities 304 of precursors 210 needed to produce one unit of item 204, and determining the total quantity of the precursors 210 needed to produce the requested quantity of item 204.

Server 110 determines whether sufficient quantities of the precursors 210 are available at step 1106. This may include, for example, server 110 scanning flows 554 entering the node 550 associated with the requirement satisfaction event 600. If the flows 554 entering node 550 contain sufficient quantities of the precursors 210, method 1100 ends. Resource 108 associated with node 550 will receive sufficient quantities of precursors 210 to produce all of the requested quantity 206 of item 204.

If resource 108 associated with node 550 will receive insufficient quantities of one or more precursors 210, server 110 identifies the precursor 210 that is most scarce at step 1108. As described above, the precursor 210 that limits production of the item 204 to the greatest degree may be considered the most "scarce" precursor 210. Server 110 identifies the fractional quantity of item 204 that can be produced using the scarcest precursor 210 at step 1110. Server 110 divides that quantity by the requested quantity of item 204, and this represents the fractional amount of item 204 that can be produced by resource 108. Server 110 identifies the quantity of each precursor 210 needed to produce the fractional quantity of item 204 at step 1112. This may include, for example, server 110 multiplying the total quantity of each precursor 210 identified at step 1104 by the fraction identified at step 1110. This reduces the quantity of each precursor 210 to be allocated to a product order. This helps to ensure that the precursors 210 are allocated to a product order in the correct proportions as defined by the bill of materials table 300 for the requested item 204.

Although FIG. 11 illustrates one example of a method 1100 for determining the quantities of precursors 210 to be allocated to a product order, various changes may be made to method 1100 without departing from the scope of the present invention. For example, method 1100 is illustrated as accessing one bill of materials table 300 to identify the quantities 304 of precursors 210 needed to produce an item 204. In another embodiment, an item 204 may be produced using multiple bill of materials tables 300. In this embodiment, server 110 may perform method 1100 for each bill of materials table 300, and server 110 may select the bill of materials table 300 that results in the production of the largest quantity of item 204.

Although the present invention has been described with several embodiments, a number of changes, substitutions, variations, alterations, and modifications may be suggested to one skilled in the art, and it is intended that the invention encompass all such changes, substitutions, variations, alterations, and modifications that fall within the spirit and scope of the appended claims.

What is claimed is:

1. A computer-implemented system, comprising:
   one or more databases storing demand breakout data;
   a server coupled with the one or more databases, the server configured to:
      access a plurality of orders for at least one product, each product produced using at least one precursor;
      access a production schedule identifying one or more resources in a supply chain, a quantity of each product and precursor scheduled to be produced by the resources, and a time period associated with production of each product and precursor; and
      generate a first event for each product order, the first event comprising a request for a specified quantity of a specified item, the first events forming a first layer in a tree;
      generate a weighted average for each of the first events, each first event associated with a plurality of attributes and an attribute value corresponding to each attribute, each attribute associated with a weight, the weighted average based on the attribute values and the attribute weights;
      execute the first events in order of decreasing weighted average by determining a specified quantity of one or more precursors needed to produce the specified quantity of the item requested by the first event, determining if at least one of the precursors needed to produce the item requested by the first event is too scarce to produce the specified quantity of the item, determining a fractional quantity of each precursor if at least one of the precursors is too scarce, and generating at least one second event for each of the precursors, the second event comprising a reservation of one of the specified quantity of a specified precursor or the fractional quantity of the specified precursor;
      execute the second events to produce one or more additional first events in a second layer of the tree; and
      propagate the first and second events through any additional layers of the tree to allocate one or more particular units of one or more precursors to each product order.

2. The system of claim 1, wherein the second event is associated with a flow that represents at least the specified quantity of the specified precursor arriving at one of the one or more resources.

3. The system of claim 1, wherein a plurality of flows representing at least one precursor are associated with the one or more resources.

4. The system of claim 3, wherein the server is further configured to execute the first event by:
   determining the specified quantity of the specified precursor using the first event;
   identifying one or more of the flows that represent the specified precursor; and
   generating at least one second event associated with at least one of the identified flows.

5. The system of claim 4, wherein generating at least one second event comprises generating a single second event associated with one flow if that flow represents at least the specified quantity of the specified precursor.

6. The system of claim 4, wherein generating at least one second event comprises generating a plurality of second events associated with a plurality of flows if none of the flows represent at least the specified quantity of the specified precursor.

7. The system of claim 1, wherein the server is further configured to identify the precursor that is most scarce using a bill of materials table.

8. The system of claim 7, wherein the server is further configured to determine a fractional quantity of the specified item that can be produced using the most scarce precursor.

9. The system of claim 8, wherein the specified item may be produced according to a plurality of bill of materials tables.

10. The system of claim 9, wherein the server is further configured to identify the bill of materials table that results in the production of the largest quantity of the specified item.

11. The system of claim 1, wherein the server is further configured to rank the first events according to their weighted average.

12. The system of claim 11, wherein the server is further configured to execute the first events based on the rank of the events.

13. The system of claim 1, wherein the server is further configured to:
   rank the first events; and
   execute the first events according to their rank.

14. The system of claim 1, wherein at least one of the precursors needed to produce the item requested by the first event is too scarce to produce the specified quantity of the specified item.

15. The system of claim 14, wherein the server is further configured to determine a fractional quantity of each precursor needed to produce the fractional quantity of the specified item.

16. The system of claim 15, wherein the specified item may be produced according to a plurality of bill of materials tables.

17. The system of claim 16, wherein the server is further configured to identify the bill of materials table that results in the production of the largest quantity of the specified item.

* * * * *